March 24, 1959 R. D. HALL 2,879,103
TELESCOPING CABIN FOR TRUCKS
Filed April 22, 1958 2 Sheets-Sheet 1

INVENTOR.
ROBERT DONALD HALL
BY
ATTORNEY

March 24, 1959  R. D. HALL  2,879,103
TELESCOPING CABIN FOR TRUCKS
Filed April 22, 1958  2 Sheets-Sheet 2
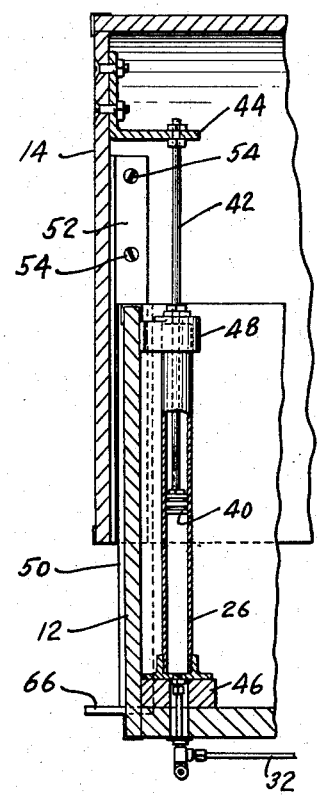
FIG. 5.
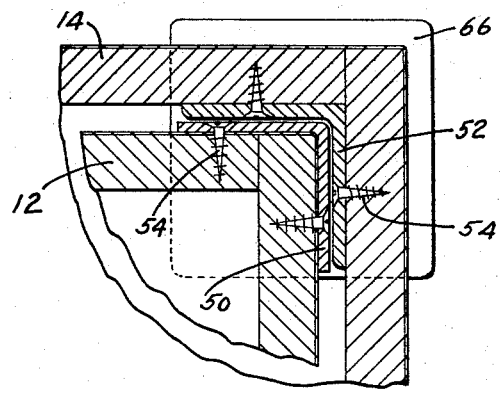
FIG. 6.
FIG. 7.
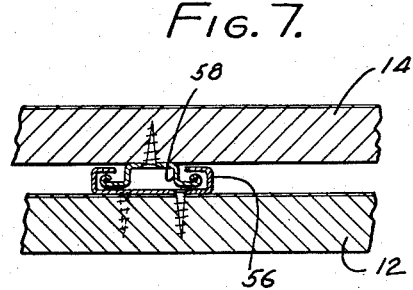
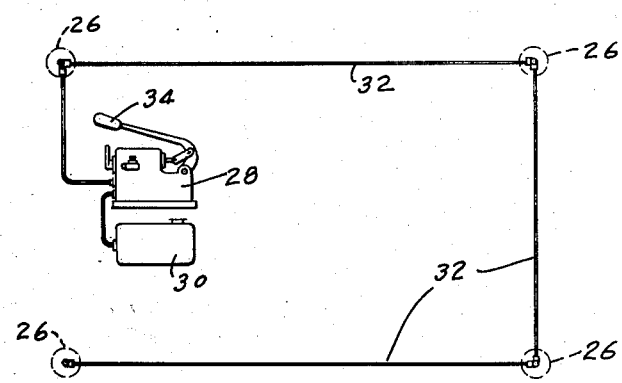
FIG. 8.
INVENTOR.
ROBERT DONALD HALL
BY
*Albert G. Fiske*
ATTORNEY

United States Patent Office 2,879,103
Patented Mar. 24, 1959

2,879,103

TELESCOPING CABIN FOR TRUCKS

Robert D. Hall, Sunland, Calif.

Application April 22, 1958, Serial No. 730,099

2 Claims. (Cl. 296—23)

This invention relates to an improved telescoping cabin for trucks, and has for one of its principal objects, the provision of a device of the class described which can be readily installed onto or into the bed of an ordinary, relatively small truck and which, if desired, can be easily removed therefrom if it is desired to use the truck for other purposes.

One of the important objects of this invention is to provide a telescoping and removable cabin for trucks, whereby the same will provide full sized living quarters or a similar housing equipment for camping trips and outdoor living purposes, but which can be readily telescoped to reduce its height and present less wind resistance when the truck with the cabin is en route from one place to another.

Another and still further important object of the invention is to provide a telescoping cabin for trucks or the like which can be made into a full sized enclosure of sufficient inside height and other dimensions to accommodate the usual number of persons under such circumstances.

Yet another object of the invention is to provide means whereby the enclosure or housing can be collapsed or telescoped into a much smaller over-all space in a minimum length of time, and wherein the process may be reversed and a full sized cabin provided, also in a matter of seconds or minutes.

Other and further important objects of the invention will be apparent from the disclosures in the accompanying drawings and following specification.

The invention, in a preferred form, is illustrated in the drawings and hereinafter more fully described.

In the drawings:

Figure 5 is a detail view, parts broken away and parts in section, taken on the line 5—5 of Figure 3, looking in the direction indicated.

Figure 6 is an enlarged view on the section line 6—6 of Figure 3.

Figure 7 is a partial section, considerably enlarged, on the line 7—7 of Figure 3.

Figure 8 is a diagrammatic view showing the hydraulic equipment for extending and telescoping the cabin of this invention.

As shown in the drawings:

Figure 1:
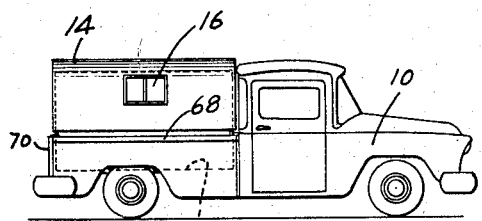
Figure 1 is a side elevation of the improved telescoping cabin for trucks, showing the same on a truck and in telescoped position.

The reference numeral 10 indicates generally a truck of the type sometimes known as a "pick-up," but obviously any other type of truck or similar vehicle may be employed with the telescoping cabin of this invention, which is here shown as positioned on the truck preferably in a removable manner. Such removable positioning renders the truck available for other purposes when not employed as a cabin conveyance.

Figure 2:
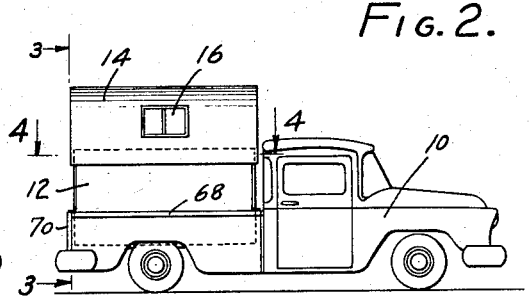
Figure 2 is a view similar to Figure 1, but showing the cabin it its uppermost or extended position, wherein it serves as a suitable living quarters for camping or similar activities.

The cabin itself is, as best shown in Figures 1 and 2, in two main sections 12 and 14, the lower and slightly smaller section being designated by the reference numeral 12 and the upper and slightly larger portion being designated by the reference numeral 14. Suitable windows or other openings may be included in the upper portion, as shown at 16.

The upper portion 14 includes a roof and the upper portion 18 of a door. The lower portion includes most of the essential equipment usually included in a camper's cabin of this type, such as a sink 20, seats or bunks and pillows or mattresses 24 and suitable space for storage. Many other detail can be incorporated into both the lower and the upper sections as desired or necessary.

Figure 4:
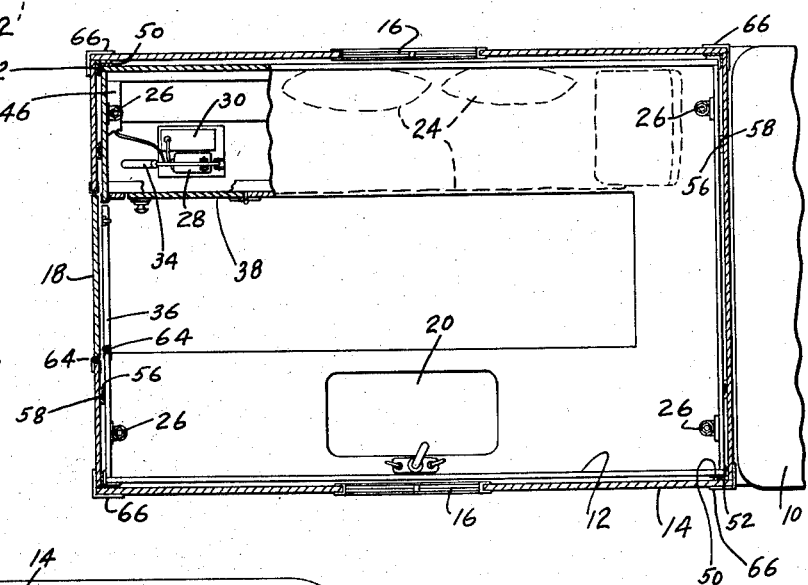
Figure 4 is a horizontal section taken on the line 4—4 of Figure 2, looking downwardly.

The sections can be composed of any suitable material, preferably light metal, plywood or the like; and the upper section is raised to its proper desired operating height by means of four cylinders 26, one at each corner as best shown in Figure 4. These cylinders are supplied with a hydraulic fluid from a pump and tank combination 28—30, as best shown in Figures 4 and 8. The pump with proper connections to conduits 32 leading to the various cylinders 26 is preferably situated in the lower left hand rear corner of the cabin, where its operating handle 34 is readily accessible to anyone desiring to use the same by simply opening the outside door 18—36 and then an inner door 38 with a subsequent pumping and cabin raising movement.

Referring now to Figure 5, it will be seen that each cylinder 26 is provided with a piston 40 movable therein, which piston includes an upwardly extending rod 42 connected to a bracket 44 fastened to each of the inside upper corners of the top portion 14 of the cabin. The cylinders 26 are held in position in the four corners of the lower portion 12 of the cabin by means of suitable supports 46 and brackets 48. This assures of a proper aligning movement in operation.

To further provide suitable guided movement between the two parts 12 and 14 of the cabin, juxtaposed angle plates 50 and 52 are provided, as best shown in Figures 5 and 6. One angle plate 50 is mounted on each of the outside four corners of the lower portion 12 of the cabin being held in position by means of screws or the like 54, and similar angle plates are fastened to the inside of the four corners of the upper section of the cabin also by screws 54; and it will be obvious that a suitable selective guided vertical relative movement between the two parts is thereby assured.

Figure 3:
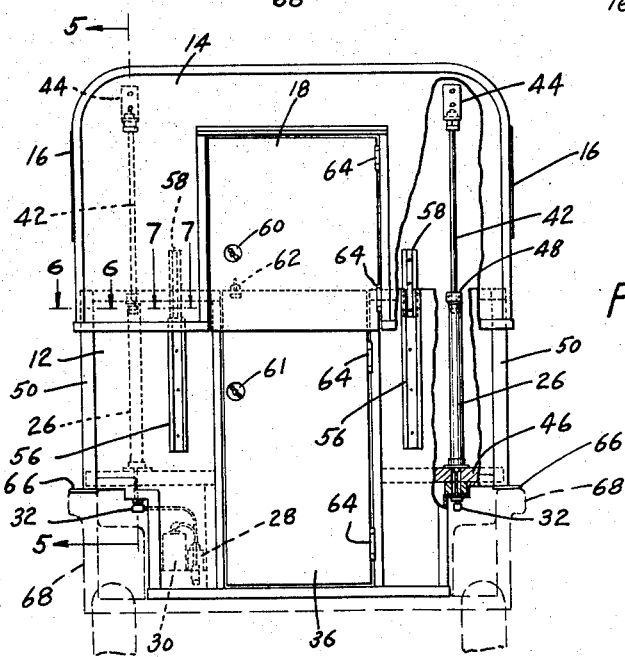
Figure 3 is an enlarged view, partly in section, taken on the plane of the line 3—3 of Figure 2, looking in the direction indicated by the arrows, and with certain parts broken away to show interior construction.

Additionally, and as a further safety measure especially for the rear panel or face of the cabin, a pair of channels 56 is provided fastened to the outerface of the lower portion 12 of the cabin (Figures 3 and 7). Suitable slides 58 are fastened to the innerface of the upper portion of the cabin. The sliding relationship helps maintain the rear panels in suitable operating relationship and also serves to insure a proper interfitting of the door sections 18 and 36 when the top is raised or lowered.

A suitable operating knob 60 is provided for the door and a latch 62 connects the two sections 18 and 36 for suitable movement about hinges 64 when the cabin is in raised position for accommodation of human occupants.

Stop plates 66 are provided at the corners of the cabin for interfitting with related portions 68 of the body of the truck 10 and any suitable means may be employed to fasten the cabin in position in the truck body. Suitable steps or other means may be provided for access to the interior; and this may include or comprise the tail-gate 70 of the truck itself.

The pump 28 is provided with the usual release valve so that the cabin can be collapsed simply by the action of gravity, and either the extending or lowering operation can be accomplished in a very short space of time and with comparatively little effort. For a larger equipment, the hydraulic pump may be so fitted and connected as to be operated by the engine of the truck.

It will be evident that herein is provided a unitary housing or cabin, which can be readily installed on an ordinary truck or practically any type now on the market and which, when so installed and moved into extended position provides a roomy, suitably sized cabin for comfortable living quarters making the same available for all types of camping trips or even long journeys. This eliminates the necessity of hauling a heavy trailer with a tow car truck or other vehicle with attendant difficulties, so far as road travel is concerned. Also, handling the ordinary trailer in limited spaces, such as parking lots, trailer camps and the like often proves to be quite difficult on account of extended length of the joined vehicles and the possibility of "jack knifing" when backing up or even on slippery roads.

The door knob 60 is on the upper door and a similar knob 61 can be on the lower door. This is flush and recessed so as not to interfere with the operation. Also, the top door 18 is usually made slightly wider than the lower door 36 as this provides better operation. The doors are usually operated as separate units so that the hinges 64 need not all be in alignment.

It will be obvious that the pump 28 can deliver air as well as a hydraulic fluid for operation of the pistons 40; and in some instances it is preferable to shift the position of the pump at right angles from that shown in Figure 4, so that the handle 34 can be more easily operated from the outside and through the doors 36 and 38. Obviously, the handle 34 can be made removable so that it will not interfere with free ingress or egress by the occupants when the top is raised. The pump can also be operated by a small motor driven by the battery.

Additionally, the cabin of this invention, when collapsed or telescoped reduces wind resistance to a minimum or substantially the same as that presented by the cab of the truck itself, whereby much more compact and satisfactory mobile unit is achieved.

It will also be obvious that larger cabins may be used on larger or longer truck beds; and in some cases, the same may extend beyond the end of the truck bed so long as a suitable fastening relationship and access steps are provided.

I am aware that many changes may be made and numerous details of construction varied throughout a wide range without departing from the principles of this invention, and I, therefore, do not propose limiting the patent granted hereon otherwise than as necessitated by the prior art.

I claim as my invention:

1. A telescoping cabin for removable positioning in a truck, wherein said truck includes a body with a bed, sides and an open end; the cabin comprising a lower section supported on the truck bed and fitted between the sides of the truck body, and an upper section vertically slidable over a portion of the lower section, said portion of the lower section being of a width and length approximating the width and length of the truck body, the upper section resting on the top edges of the truck body sides when telescoped over the lower section, hydraulic means for telescoping and extending the sections, said hydraulic means comprising a pump in the lower cabin section adjacent the rear thereof, a piston and cylinder combination in each corner of the assembled cabin sections fastened to the upper and lower sections, respectively, fluid lines connecting the pump and cylinders for simultaneous operation, guides for alining the two sections for relative movement, said guides comprising exterior and interior angle plates slidable with respect to each other and fixed at the juxtaposed corners of the cabin sections, the guide means also including channels on one section of the cabin and cooperating slides on the other section.

2. A device as described in claim 1, wherein each of the cabin section includes a rear door portion, means for separately operating the rear door portions and wherein the door in the lower cabin section provides access to the hydraulic pump.

References Cited in the file of this patent

UNITED STATES PATENTS

| | | |
|---|---|---|
| 2,173,076 | Stetson | Sept. 12, 1939 |
| 2,193,352 | Thomas | Mar. 12, 1940 |
| 2,343,261 | Marple | Mar. 7, 1944 |
| 2,559,029 | Randolph | July 3, 1951 |
| 2,581,556 | Rogers | Jan. 8, 1952 |
| 2,656,216 | Bobroff | Oct. 21, 1953 |
| 2,788,238 | Baird | Apr. 9, 1957 |
| 2,821,428 | Webster | Jan. 28, 1958 |

FOREIGN PATENTS

| | | |
|---|---|---|
| 1,043,803 | France | June 17, 1953 |
| 61,718 | Norway | Nov. 13, 1939 |